(12) United States Patent
Sproles et al.

(10) Patent No.: US 9,264,409 B2
(45) Date of Patent: Feb. 16, 2016

(54) NETWORK SECURITY LOAD BALANCING

(75) Inventors: Kevin Sproles, Austin, TX (US);
William Turner, Austin, TX (US)

(73) Assignee: Volusion, Inc., Austin, TX (US)

( * ) Notice: Subject to any disclaimer, the term of this patent is extended or adjusted under 35 U.S.C. 154(b) by 656 days.

(21) Appl. No.: 13/470,702

(22) Filed: May 14, 2012

(65) Prior Publication Data

US 2013/0305038 A1    Nov. 14, 2013

(51) Int. Cl.
*H04L 12/729* (2013.01)
*H04L 29/06* (2006.01)
*H04L 29/08* (2006.01)

(52) U.S. Cl.
CPC .......... *H04L 63/0485* (2013.01); *H04L 63/168* (2013.01); *H04L 67/1002* (2013.01)

(58) Field of Classification Search
CPC ............ H04L 67/104; H04L 2012/568; H04L 47/125; H04L 67/1002; H04L 63/0485; H04L 63/168
USPC .......................................... 713/152, 156, 175
See application file for complete search history.

(56) References Cited

U.S. PATENT DOCUMENTS

| 7,139,792 | B1 * | 11/2006 | Mishra et al. | 709/203 |
|---|---|---|---|---|
| 2002/0111853 | A1 * | 8/2002 | O'Ryan | 705/14 |
| 2003/0182423 | A1 * | 9/2003 | Shafir et al. | 709/225 |
| 2010/0223364 | A1 * | 9/2010 | Wei | 709/220 |
| 2011/0179176 | A1 * | 7/2011 | Ravichandran et al. | 709/226 |

FOREIGN PATENT DOCUMENTS

WO    0014633 A1    3/2000

OTHER PUBLICATIONS

Foreign Communication From a Counterpart Application, PCT Application PCT/US2013/037447, International Search Report dated Aug. 16, 2013, 5 pages.
Foreign Communication From a Counterpart Application, PCT Application PCT/US2013/037447, Written Opinion dated Aug. 16, 2013, 7 pages.
Intel: "Intel NetStructure 7280 XML Director User Guide," Internet Citation, XP002324084, Jan. 31, 2001, 28 pages.
SonicWall: "SonicWALL SSL Device User's Guide," XP055074333, Jan. 1, 2003, 19 pages.
"Manual Chapter: Configuring Load Balancing Pools," Configuration Guide for BIG-IP Local Traffic Management, XP055074433, Jun. 2, 2009, 20 pages.
"iSD100-SSL Secure Sockets Layer Offload Device Installation and User's Guide," Internet Citation, XP002323817, Sep. 2000, 59 pages.

(Continued)

*Primary Examiner* — Ellen Tran
(74) *Attorney, Agent, or Firm* — Conley Rose, P.C.; Stewart Mesher; Grant Rodolph (57) ABSTRACT

A website hosting system includes a request routing node and a plurality of security termination nodes coupled to the request routing node. Each security termination node is configured to secure connections between servers hosting websites and customers of the websites in accordance with a predetermined quality of service level. The request routing node balances incoming requests for secure websites among the security termination nodes based on an application-specific parameter (e.g., quantity of items in a product catalog, location, etc.).

25 Claims, 4 Drawing Sheets

(56) References Cited

OTHER PUBLICATIONS

Foreign Communication From a Counterpart Application, PCT Application No. PCT/US2013/037447, International Search Report dated Aug. 16, 2013, 5 pages.

Foreign Communication From a Counterpart Application, PCT Application No. PCT/US20131037447, Written Opinion dated Aug. 16, 2013, 7 pages.

"iSD100-SSL Secure Sockets Layer Offload Device Installation and User's Guide" Internet Citation, XP002323817, Retrieved from the Internet: http://www.116.nortelnetworks.com/docs/bvdoc/alteon/isd_ssl/050125.C.pdf, Sep. 2000, 6 pages.

"Manual Chapter: Configuring Load Balancing Pools," Configuration Guide for BIG-IP Local Traffic Management, Retrieved from the Internet: http://support.f5.com/kb/en-us/products/big-ip_ltm/manuals/products/ltm_configuration_guide_10_0_0/ltm_pools.html, Mar. 12, 2009, 19 pages.

Intel, "Intel NetStructure 7280 XML Director," User Guide, XP-002324084, A35201-002, Jan. 31, 2001, 28 pages.

"Secure Sockets Layer Offload Device," Installation and User's Guide, iSD100-SSL, Sep. 2000, 59 pages.

"SonicWall SSL Device User's Guide," Retrieved from the Internet: http://help.mysonicwall.com/documentation/manuals/ssl/SSL-R/4.2.0/Cover.html, XP055074333, Jan. 1, 2003, 19 pages.

* cited by examiner

NETWORK SECURITY LOAD BALANCING

BACKGROUND

Owning and operating a business is expensive. Many businesses would like to offer their products or services for sale on-line. The cost to own and manage servers and associated software and other networking infrastructure to provide a "virtual store" is significant. Further, customers of the virtual store may provide their names, addresses, credit card numbers and other confidential information to the virtual store to complete a transaction. Ensuring the privacy and confidentiality of such information is of particular concern.

SUMMARY

Various embodiments are disclosed herein in which the performance level of security verification is dynamically configured for a given client's hosted e-store based on any one of a variety of application-specific parameters. In one implementation, a website hosting system includes a request routing node and a plurality of security termination nodes coupled to the request routing node. Each security termination node is configured to secure connections between servers hosting websites and customers of the websites in accordance with a predetermined quality of service level. The request routing node balances incoming requests for secure websites among the security termination nodes based on an application-specific parameter (e.g., quantity of items in a product catalog, location, etc.).

Another embodiment is directed to a method that includes receiving a request for a secure connection from a browser and determining which of a plurality of security termination nodes to assign the request for the secure connection based on an application-specific parameter. The method further includes transmitting the request to the security termination node determined in the preceding step.

Yet other embodiments are directed to a non-transitory computer-readable medium storing instructions that, when executed by a processor, causes the processor to perform various actions such as receive a request for a secure connection and determine which of a plurality of security termination nodes to assign the request based on an application-specific parameter. The software may further cause the processor to transmit the request to the determined security termination node.

Another embodiment is directed to a web-hosting system that includes a request router and a plurality of secure termination nodes coupled to the request router. Each secure termination node creates secure connections between browsers and web servers based on certificates based on a predetermined level of service. The request router balances incoming requests for security certificate verification among the security termination nodes based on an application-specific parameter. The system may also include a load balancer coupled to the plurality of secure termination nodes as well as a plurality of application servers coupled to the load balancer. The load balancer balances web page access requests among the application servers. The web-hosting system is configured to host a plurality of websites, each website having its own unique Internet Protocol (IP) address.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
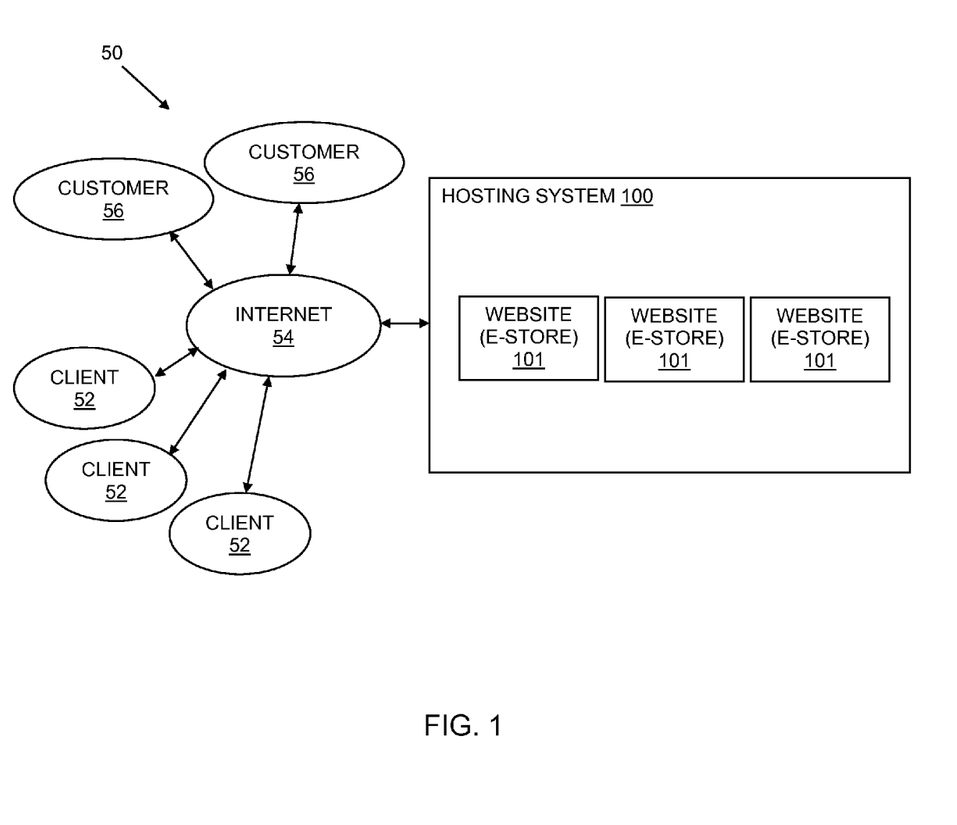
FIG. 1 depicts a system for hosting websites (e.g., e-stores) for clients in accordance with various embodiments.

FIG. 1 illustrates an embodiment of the invention in which a hosting system 100 hosts one or more websites 101 on behalf of one or more clients 52. The hosting system 100 creates, updates, and otherwise controls the various websites 101. The websites 101 can be for any purpose such as the sale of goods or services to one or more customers 56. For illustrative purposes, the client websites will be referred to as "e-stores" but this disclosure is not limited to websites that only offer goods/services for sale. For example, the websites may be information-only websites. Rather than the clients 52 having their own network infrastructure (e.g., servers) to host their own website, the hosting system 100 provides the requisite servers, software support, and other infrastructure. The clients 52 only need to have a computing device (e.g., a desktop computer, laptop computer, smart phone, etc.) with Internet access and a browser to create their own e-store 101, maintain their store, and complete transactions with customers 56. Similarly, customers 56 require only a computer with Internet access and a browser as well to access the e-stores 101 and complete transactions. The clients 52 and customers 56 access the e-stores 101 via the Internet 54 or other suitable network. The terms "client" and "customer" in this disclosure include a computing device of some sort to access the hosting system 100 and target e-store 101 through the Internet 54.

For e-stores that provide items (goods and/or services) for sale, at some point the customer 56 will "check out" to complete the sale transaction. The check-out process may require the customer 56 to provide sensitive information such as a credit card number. In accordance with various embodiments, the Secure Socket Layer (SSL) protocol is used to ensure the security of an on-line connection between the e-store 101 and a customer 56. The SSL protocol involves a multi-step handshake between the two entities attempting to establish a secure protocol. SSL is a standard security technology for encrypting a connection between a web server (in this case, the hosting system) and a browser (e.g., customers 56). Once established, the connection encrypts all traffic and ensures that all data passed between server and browser remain private.

SSL security verification requires the sever to have an SSL certificate. The certificate is issued to the server by a trusted, third party Certificate Authority (CA). The server generates two cryptographic keys—a private key and a public key, and the CA generates the SSL certificate for the sever on the basis of one or both of the cryptographic keys and other information such as the domain name of the website (the e-store's domain name). The CA validates the information provided by the server and issues the SSL certificate. The certificate itself contains the domain name of the sever, the company's name, address, etc. The certificate may also contain an expiration date and details of the CA responsible for its issuance.

Each certificate thus is tied to an e-store 101 in accordance with the preferred embodiments of the invention—a separate, unique certificate for each e-store. When a customer's browser connects to a secure e-store 101, the browser retrieves the e-stores SSL certificate and verifies that the certificate has not expired, that the certificate was issued by a trusted CA, and that the certificate is being used by the e-store for which the certificate was issued. The customer's browser then creates a symmetric key which it sends to the hosting system 100. The hosting system 100 decrypts the browser's symmetric key using its own private key, and sends the required web page of the target e-store encrypted with the symmetric key. The browser decrypts the page using the symmetric key and also displays the information.

In accordance with the preferred embodiments, each e-store 101 is provided its own unique Internet protocol (IP) address. Thus, if the hosting system 100 has 50,000 clients 52, it provides 50,000 unique IP addresses—one IP address for each client 52. Verifying SSL certificates is a process that is unique to each computer (e.g., customer 56) attempting to access an e-store to shop and complete a transaction and unique to each e-store as explained above. As the number of e-stores 101 and customers grows, the computational burden on the hosting system 100 to process requests for secure web pages grows as well. For example, the hosting system responds to a request for a secure e-store by examining a database to retrieve a public key and SSL certificate for the targeted e-store, sending the public key and certificate to the requesting browser, and decrypting the browser's encrypted symmetric key to complete a symmetric key exchange process. The hosting system 100 provides an efficient way to process requests for secure pages. The embodiments described herein are provided in the context of SSL certificates, but these principles can be applied to other connection security techniques besides SSL.

Figure 2:
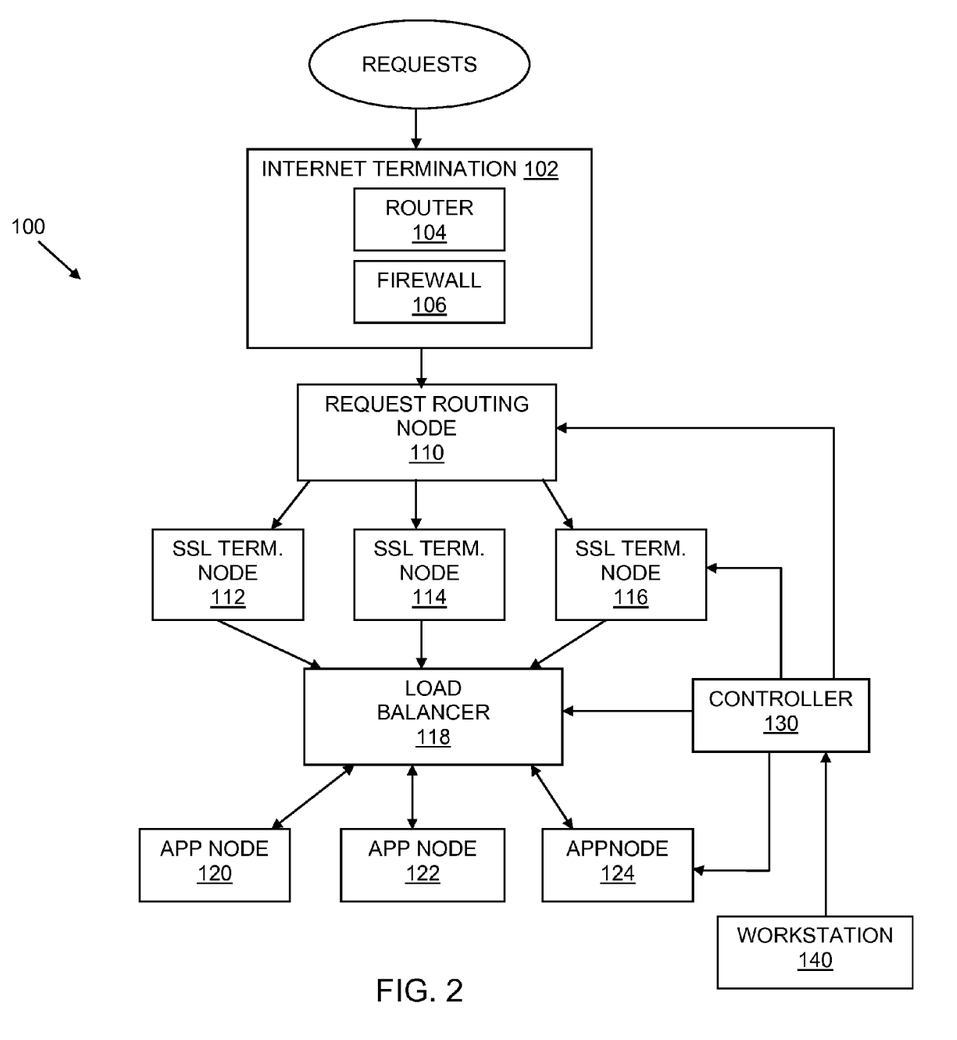
FIG. 2 illustrates a configuration of a hosting system in accordance with various embodiments.

FIG. 2 shows an illustrative implementation of the hosting system 100. The implementation shown in FIG. 2 includes an Internet Termination node 102 which comprises a router 104 and a firewall 106. Multiple routers 104 and/or firewalls 106 can be provided as desired. The routers 104 route incoming requests for secure e-stores, and the firewall 106 detects improper communications such as might be indicative of an attack.

The Internet Termination node 102 couples to a request routing node 110, which in turn couples to various SSL termination nodes 112, 114, and 116. Any number of SSL termination nodes can be included. In some implementations, for example, there is one SSL termination node every 1000 clients 52. The request routing node 110 balances the incoming requests among the various SSL termination nodes 112, 114, and 116 for the purpose of processing requests for secure connections between an external entity such as a customer 56 and an e-store 101 hosted on the hosting system 100.

Each SSL termination node comprises on more servers for its functionality. Some SSL termination nodes 112-116 are capable of higher quality of service than other SSL termination nodes. Quality of service may refer to any of: processor speed, throughput, number of severs comprising a single SSL termination node, etc. For example, some SSL termination nodes may have faster processors than other SSL termination nodes. In some implementations, the hosting system 100 provides three levels of SSL termination node performance (quality of service). For example, a "gold" level of SSL verification may provide the highest level of SSL support, "silver" is a middle level, and "bronze" is the lowest level. More or fewer than three SSL performance levels are possible in other embodiments. A higher SSL performance level sets up an encrypted connection between a server and a browser more quickly than for a lower performance level.

Each client 52 may purchase whatever SSL verification performance level that client desires. Based on the client's selection, the request routing node 110 routes requests targeting that client's e-store 101 to the appropriate SSL termination node 112-116 which performs the aforementioned SSL-based handshaking to verify and secure the connection. Thus, each SSL termination node 112-116 preferably responds to a request for a secure web page by retrieving the requisite encryption keys and certificate, sends the public key and certificate to the requesting web browser and decrypts the encrypted symmetric key from the browser among other actions.

Once the connection has been secured, the request is then provided to the load balancer 118. The load balancer 118 performs additional load balancing of the requests to the appropriate application nodes 120, 122, or 124. Three application nodes are shown, but any number of application nodes is possible. Each application node 120-124 may be implemented by one or more servers. Each application node performs a specific task such as verifying usernames and passwords, processing credit card transactions, providing the product information for the goods/services offered by a client's e-store, etc. To the extent that a given application node 120-124 is implemented with multiple servers, the load balancer 118 balances the requests among the various servers in accordance with any of a variety of load balancing techniques (e.g., round robin).

The hosting system 100 also includes a controller 130 that couples to the request routing node 110, the SSL termination nodes 112-116, the load balancer 118, and the application nodes 120-124. The controller 130 controls the operation of the various hardware to which it connects. One action performed by the controller 130 is to alter how the request routing node balances incoming requests among the various SSL termination nodes 112-116 based on one or more application-specific parameters. In addition to, or instead of, the client purchasing its own SSL performance level of service, the SSL performance level of service for a given client may be altered (increased or decreased) based on any one or more application-specific parameters as explained below.

Any of a variety of application-specific parameters can be used for this purpose. One such parameter is the number of items in a client's catalog of goods/services being offered to customers. For example, a client 52 might currently have a lower level of SSL verification service and have a number of items in its catalog below a predetermined threshold (e.g., 500 item threshold). Then, if the client adds items to its catalog which, as a result, causes the quantity of items in the catalog to surpass the threshold (e.g., exceeds 500), the controller 130 automatically configures the request routing node 110 to implement a higher SSL performance level for that client. One of the application nodes 120-124 may store the product catalog for each client 52. A background daemon may run that is programmed to report the quantity of items in each catalog at periodic time periods, or report when a client's product catalog surpasses the threshold which may be programmable. The controller 130 sends a message to the request routing node 110 that a higher level of SSL performance is to be provided for all future connections for that client's e-store. The request routing node 110 responds by forwarding future SSL verification requests to the SSL termination node 112-116 that provides the requisite higher level of performance.

Another parameter is geographical location. Incoming SSL requests from a particular geographical location may be considered to be higher priority and thus assigned a higher SSL performance level. Time zone may also be a parameter used to control the SSL performance level for a given client. Incoming requests received from, for example, the Eastern time zone may be given higher priority than requests received from the Mountain time zone. The volume or rate of traffic (e.g., sales transactions) may also prompt the controller 130 to alter the SSL performance level for a given client. A rate of sales transactions higher than a threshold may prompt the controller 130 to cause the request routing node 110 to increase the SSL performance level until if and when the volume or rate of sales transactions falls below the threshold.

The controller 130 may be programmed to cause the request routing node 110 to implement a higher SSL performance level for a given client, but only for a temporary period of time. For example, the client may run a promotional sale or enjoy a high level of publicity that may drive up sales to that client's e-store for a short period of time (hours, days, weeks, etc.). The controller 130 may cause the request routing node 110 to heighten the SSL performance level at the start of the sale/heightened publicity and reduce it back down after a programmable period of time.

Figure 3:
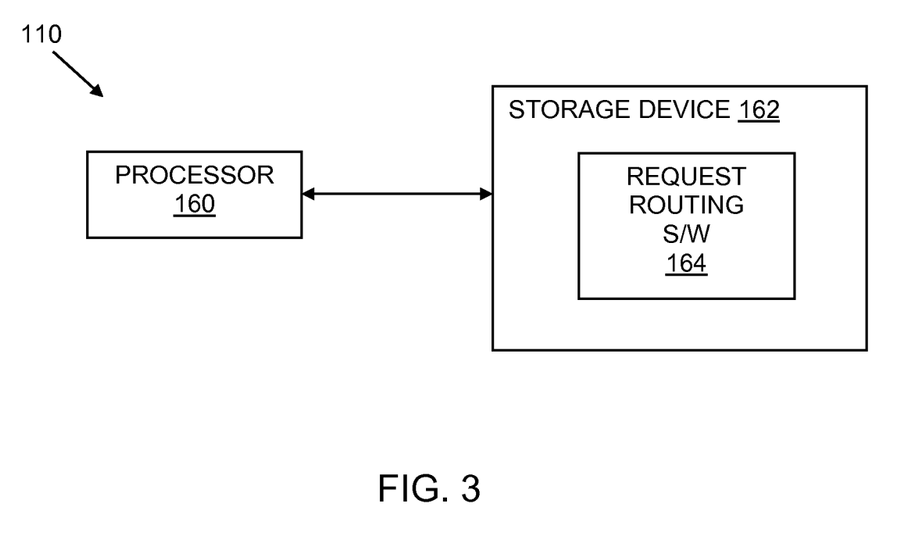
FIG. 3 illustrates an implementation of a request routing node in accordance with various embodiments.

FIG. 3 illustrates one suitable implementation of the request routing node 110. The implementation shown includes a processor 160 coupled to a non-transitory computer-readable storage device 162 (e.g., hard disk drive, random access memory, Flash storage, compact disc read-only memory (CD-ROM), etc.). Request routing software 164 is provided on the storage device 162 and executed by the processor 160. The software 164 causes the processor 160 to perform some or all of the functionality described herein as attributed to the request routing node 110. The architecture of FIG. 3 may apply to the other elements of the hosting system 100 of FIG. 2.

Referring again to FIG. 2, the hosting system 100 also includes a workstation 140 coupled to the controller 130. A user can configure the controller using the workstation. For example, the user can specify the threshold for client's catalogs of goods/services (500 in the example) of above which the controller triggers the request routing node to change its SSL verification performance level. By way of an additional example, a user of the workstation 140 can program the controller 130 for the period of time to maintain a heightened SSL verification performance level following a sale or publicity for the client 52.

Figure 4:
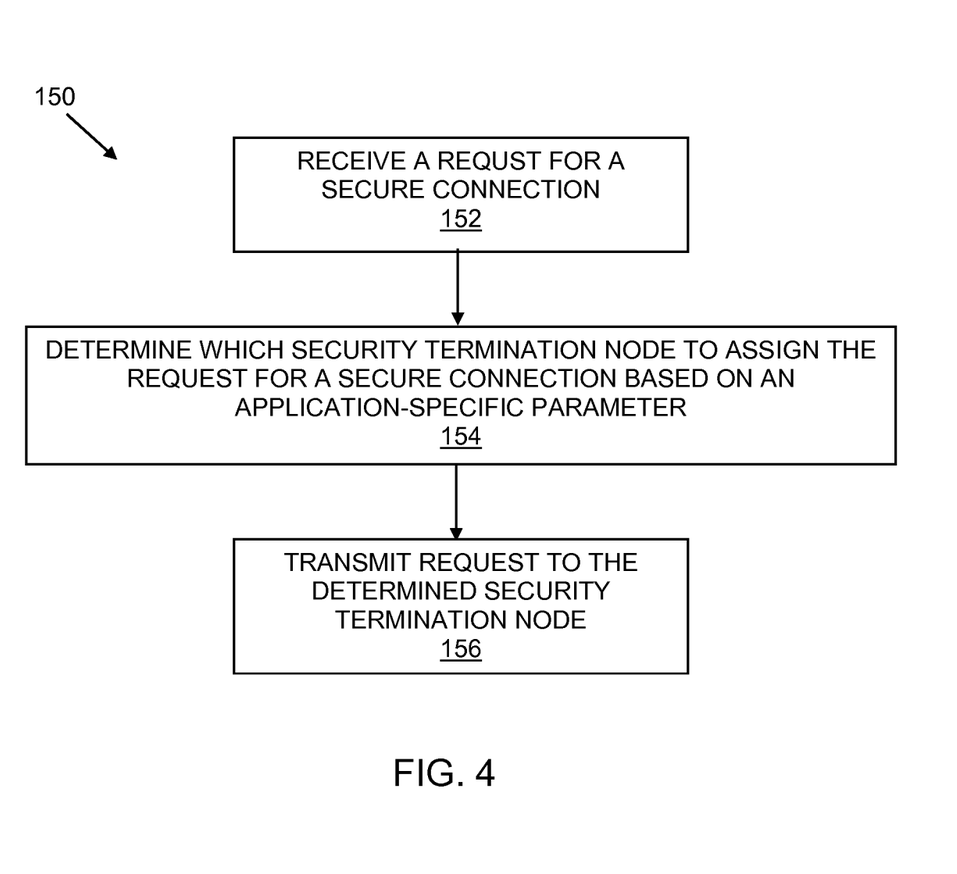
FIG. 4 shows a flow chart in accordance with various embodiments.

FIG. 4 shows a method 150 in accordance with various embodiments. The various actions depicted in FIG. 4 may be performed in the order shown, or in a different order. At step 152, the method includes receiving a request for a secure connection from a browser for a target e-store 101. At step 154, the method further includes determining which of a plurality of security termination nodes to assign the request for a secure connection based on an application-specific parameter. Any one or more of the application-specific parameters noted above, or other parameters, may be used for this purpose. The method also includes step 156 transmitting the request to the security termination node resulting from the determination of step 154.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A website hosting system, comprising:
a request routing node; and
a plurality of security termination nodes coupled to the request routing node,
wherein each security termination node is configured to secure connections between servers hosting websites and customers of the websites in accordance with a predetermined quality of service level,
wherein the request routing node balances incoming requests for secure websites among the security termination nodes based on an application-specific parameter,
wherein the request routing node is configured to change the predetermined quality of service level based on the application-specific parameter,
wherein the application-specific parameter comprises a previously specified service tier assigned to a user of the system,
wherein the previously specified service tier comprises one of three different tiers,
wherein the three different tiers comprise a first tier associated with a lowest quality of service level, a second tier associated with a medium quality of service level, and a third tier associated with a highest quality of service level, and
wherein the request routing node is configured to change the predetermined quality of service level based on the application-specific parameter comprises the request routing node being configured to temporarily increase the predetermined quality of service level for a programmable period of time and then lower the predetermined quality of service level after the programmable period of time has passed.

2. The system of claim 1, wherein the request routing node is configured to change the predetermined quality of service level based on the application-specific parameter comprises the request routing node being configured to change the predetermined quality of service level when a status associated with the application-specific parameter exceeds a predetermined threshold value, and wherein the application-specific parameter comprises a rate or volume of traffic.

3. The system of claim 1, wherein the application-specific parameter is an indicator of geographical location, and wherein the predetermined quality of service level for a first geographical location is increased and the predetermined quality of service level for a second geographical location is decreased.

4. The system of claim 1, wherein the application-specific parameter is a quantity of items in a catalog offered for sale by the application, and wherein the predetermined quality of service level is increased as the quantity of items in the catalog is increased.

5. The system of claim 1, wherein the application-specific parameter comprises a time zone, and wherein different time zones are associated with different quality of service levels.

6. The system of claim 1, wherein each security termination node implements a Secure Socket Layer (SSL) protocol.

7. The system of claim 1 further comprising a plurality of websites hosted by the system, wherein each website is assigned a unique Internet Protocol (IP) address, and wherein the plurality of websites comprises websites that sell goods, sell services, and provide information.

8. The system of claim 1, wherein the quality of service comprises processing speed, throughput, and number of processing nodes.

9. A method comprising:
receiving a request for a secure connection from a browser, wherein the secure connection is in accordance with a predetermined quality of service level;
determining which of a plurality of security termination nodes to assign the request for the secure connection based on an application-specific parameter, wherein the predetermined quality of service level is changed based on the application-specific parameter; and
transmitting the request to the determined security termination node,
wherein determining which of the plurality of security termination nodes further comprises determining a previously specified service tier assigned to a user of a network security load balancing system,
wherein the previously specified service tier comprises one of three different tiers,
wherein the three different tiers comprise a first tier associated with a lowest quality of service level, a second tier associated with a medium quality of service level, and a third tier associated with a highest quality of service level, and
wherein the predetermined quality of service level is changed based on the application-specific parameter comprises the predetermined quality of service level being temporarily increased for a programmable period of time and then being lowered after the programmable period of time has passed.

10. The method of claim 9, wherein the application-specific parameter is indicative of rate of network traffic or volume of network traffic, wherein determining which of the plurality of security termination nodes further comprises determining whether the rate or volume of traffic exceeds a threshold, and wherein the quality of service level is increased when the rate or volume of traffic exceeds the threshold.

11. The method of claim 9, wherein determining which of the plurality of security termination nodes further comprises determining the application-specific parameter is a quality of service level.

12. The method of claim 9, wherein determining which of the plurality of security termination nodes further comprises determining the application-specific parameter is a quantity of items in a catalog offered for sale by an application, and wherein the quality of service level is increased as the quantity of items in the catalog is increased.

13. The method of claim 9, wherein the determined security termination node implements Secure Socket Layer (SSL) verification.

14. A non-transitory computer-readable medium storing instructions that, when executed by a processor, causes the processor to:
receive a request for a secure connection, wherein the secure connection is in accordance with a predetermined quality of service level;
determine which of a plurality of security termination nodes to assign the request based on an application-specific parameter, wherein the predetermined quality of service level is changed based on the application-specific parameter; and
transmit the request to the determined security termination node,
wherein the instructions further cause the processor to determine that the application-specific parameter is a previously specified service tier assigned to a user of a system,
wherein the previously specified service tier comprises one of three different tiers,
wherein the three different tiers comprise a first tier associated with a lowest quality of service level, a second tier associated with a medium quality of service level, and a third tier associated with a highest quality of service level, and
wherein the predetermined quality of service level is changed based on the application-specific parameter comprises the predetermined quality of service level being temporarily increased for a programmable period of time and then being lowered after the programmable period of time has passed.

15. The non-transitory computer-readable medium of claim 14, wherein the application-specific parameter is indicative of rate of network traffic or volume of network traffic, wherein the instructions cause the processor to determine which of the plurality of security termination nodes to assign the request by determining whether the rate or volume of traffic exceeds a threshold, and wherein the predetermined quality of service level is increased when the rate or volume of traffic exceeds the threshold.

16. The non-transitory computer-readable medium of claim 14, wherein the instructions further cause the processor to determine the application-specific parameter is a quality of service level.

17. The non-transitory computer-readable medium of claim 14, wherein the instructions further cause the processor to determine the application-specific parameter is a geographical location, and wherein different geographical locations are associated with different predetermined quality of service levels.

18. The non-transitory computer-readable medium of claim 14, wherein the instructions further cause the processor to determine the application-specific parameter is a quantity of items in a catalog offered for sale by an application, and wherein the predetermined quality of service level is increased as the quantity of items in the catalog is increased.

19. The non-transitory computer-readable medium of claim 14, wherein the instructions further cause the processor to trigger the determined security termination node to implement Secure Socket Layer (SSL) verification.

20. A web-site hosting system, comprising:
a request router;
a plurality of secure termination nodes coupled to the request router, wherein each secure termination node creates secure connections between browsers and web servers based on certificates based on a predetermined level of service, wherein the request router balances incoming requests for security certificate verification among the security termination nodes based on an application-specific parameter;
a load balancer coupled to the plurality of secure termination nodes; and
a plurality of application servers coupled to the load balancer, wherein the load balancer balances web page access requests among the application servers,
wherein the web-hosting system is configured to host a plurality of websites,
wherein each website has its own unique Internet Protocol (IP) address,
wherein the request router is configured to change the predetermined level of service based on the application-specific parameter,
wherein the application-specific parameter comprises a previously specified service tier assigned to a user of the system,
wherein the previously specified service tier comprises one of three different tiers, wherein the three different tiers comprise a first tier associated with a lowest quality of service level, a second tier associated with a medium quality of service level, and a third tier associated with a highest quality of service level, and wherein the request router is configured to change the predetermined quality of service level based on the application-specific parameter comprises the request router being configured to temporarily increase the predetermined quality of service level for a programmable period of time and then lower the predetermined quality of service level after the programmable period of time has passed.

21. The system of claim 20, wherein the application-specific parameter comprises a rate or volume of traffic, and wherein the predetermined level of service is increased as the rate or volume of traffic is increased.

22. The system of claim 20, wherein the application-specific parameter is an indicator of geographical location, and wherein different geographical locations are associated with different predetermined levels of service.

23. The system of claim 20, wherein the application-specific parameter is a quantity of items in a catalog offered for sale by the application, and wherein the predetermined level of service is increased as the quantity of items in the catalog is increased.

24. The system of claim 20, wherein at least one secure termination node implements Secure Socket Layer (SSL) verification.

25. The system of claim 20, wherein the secure termination node is a Secure Socket Layer (SSL) termination node.

* * * * *